(12) United States Patent
Trueheart et al.

(10) Patent No.: US 12,180,817 B2
(45) Date of Patent: Dec. 31, 2024

(54) DEBRIS SEPARATOR

(71) Applicant: SANDBOX ENTERPRISES, LLC, Katy, TX (US)

(72) Inventors: Chad Trueheart, Katy, TX (US); Casey Taylor, Katy, TX (US); George Garcia, Katy, TX (US); Derek Ussery, Katy, TX (US)

(73) Assignee: SANDBOX ENTERPRISES, LLC, Katy, TX (US)

( * ) Notice: Subject to any disclaimer, the term of this patent is extended or adjusted under 35 U.S.C. 154(b) by 0 days.

(21) Appl. No.: 18/228,903

(22) Filed: Aug. 1, 2023

(65) Prior Publication Data

US 2024/0060408 A1    Feb. 22, 2024

Related U.S. Application Data

(60) Provisional application No. 63/405,944, filed on Sep. 13, 2022, provisional application No. 63/398,978, filed on Aug. 18, 2022.

(51) Int. Cl.
| | |
|---|---|
| *E21B 43/267* | (2006.01) |
| *B01D 29/15* | (2006.01) |
| *B01D 29/23* | (2006.01) |
| *B01D 29/60* | (2006.01) |
| *B01D 37/00* | (2006.01) |
| *E21B 43/26* | (2006.01) |
| *E21B 43/34* | (2006.01) |

(52) U.S. Cl.
CPC .......... *E21B 43/2607* (2020.05); *B01D 29/15* (2013.01); *B01D 29/23* (2013.01); *B01D 29/606* (2013.01); *B01D 37/00* (2013.01); *E21B 43/34* (2013.01)

(58) Field of Classification Search
CPC ...................................................... E21B 43/26
See application file for complete search history.

(56) References Cited

U.S. PATENT DOCUMENTS

| | | | | |
|---|---|---|---|---|
| 4,183,813 A | * | 1/1980 | Black ..................... | B01D 45/14 |
| | | | | 210/512.1 |
| 6,979,397 B2 | | 12/2005 | Evanovich et al. | |

(Continued)

FOREIGN PATENT DOCUMENTS

| | | |
|---|---|---|
| WO | 2020018269 A1 | 1/2020 |
| WO | 2020219976 A1 | 10/2020 |

OTHER PUBLICATIONS

International Search Report issued in International Application No. PCT/US2023/030337, mailed Dec. 5, 2023 (4 pages).

(Continued)

*Primary Examiner* — William D Hutton, Jr.
*Assistant Examiner* — Avi T Skaist
(74) *Attorney, Agent, or Firm* — Osha Bergman Watanabe & Burton LLP

(57) ABSTRACT

A debris separator may include a housing having an inlet end, an outlet end, and an internal bore therebetween having a tapered discharge transitioning to the outlet end; and a filter basket connected to the housing at the inlet end and extending into the internal bore, thereby forming an annulus between the filter basket and the housing, the filter basket having a mesh size selected to pass a slurry of proppant therethrough and retain solid objects of a larger size than the proppant.

16 Claims, 8 Drawing Sheets

(56) References Cited

U.S. PATENT DOCUMENTS

| | | |
|---|---|---|
| 7,926,564 B2 | 4/2011 | Phillippi et al. |
| 8,360,152 B2 | 1/2013 | DeFosse et al. |
| 8,464,971 B1 | 6/2013 | Munisteri |
| 8,585,909 B2 | 11/2013 | McAfee et al. |
| 8,851,179 B2 | 10/2014 | DeFosse et al. |
| 9,091,160 B2 | 7/2015 | Renick et al. |
| 9,297,246 B2 | 3/2016 | Smartt et al. |
| 9,447,646 B1 | 9/2016 | Beason |
| 9,708,870 B2 | 7/2017 | Posa |
| 9,732,603 B2 | 8/2017 | Benavides |
| 9,744,485 B2 | 8/2017 | Burns et al. |
| 10,180,055 B2 | 1/2019 | Benavides |
| 10,702,801 B2 | 7/2020 | Martin |
| 10,704,374 B2 | 7/2020 | Martin |
| 10,704,375 B2 | 7/2020 | Martin |
| 10,767,457 B2 | 9/2020 | Ghasripoor et al. |
| 10,830,029 B2 | 11/2020 | Bishop |
| 10,974,980 B2 | 4/2021 | Englram |
| 11,028,656 B2 | 6/2021 | Biggerstaff et al. |
| 11,040,900 B2 | 6/2021 | Patton |
| 11,125,218 B2 | 9/2021 | Botting et al. |
| 11,326,430 B2 | 5/2022 | Ghasripoor et al. |
| 2005/0011648 A1* | 1/2005 | Nguyen ............ E21B 43/025 166/276 |
| 2015/0292313 A1 | 10/2015 | Morin et al. |
| 2019/0071961 A1 | 3/2019 | Hugonin |
| 2019/0374879 A1 | 12/2019 | Nagge et al. |
| 2020/0016611 A1 | 1/2020 | Kibler et al. |
| 2020/0102234 A1 | 4/2020 | Patton |
| 2020/0130017 A1 | 4/2020 | Trifol et al. |
| 2020/0325760 A1 | 10/2020 | Markham |
| 2021/0102432 A1 | 4/2021 | Comeaux et al. |
| 2021/0252431 A1 | 8/2021 | Malone et al. |
| 2021/0299595 A1 | 9/2021 | Malone et al. |
| 2022/0120148 A1 | 4/2022 | Haymore |

OTHER PUBLICATIONS

Written Opinion issued in International Application No. PCT/US2023/030337, mailed Dec. 5, 2023 (7 pages).

* cited by examiner

DEBRIS SEPARATOR

CROSS-REFERENCE TO RELATED APPLICATIONS

This application claims priority to U.S. patent application No. 63/398,978, filed on Aug. 18, 2022, and U.S. patent application No. 63/405,944, filed on Sep. 13, 2022, both of which are herein incorporated by reference in their entirety.

BACKGROUND

Hydraulic fracturing, also called fracking, is a well stimulation technique involving the fracturing of bedrock formations by a pressurized liquid, often referred to as a slurry. The slurry of liquid and other materials (including proppants such as sand) are injected at high pressure to create small fractures within tight shale formations to stimulate the production and safely extract hydrocarbons from the formation. Proppant usage in hydraulic fracturing operations has changed significantly over the years, but particularly with the increase of shale gas formations. Thus, the average proppant demand per well has increased significantly, resulting in consideration of new or different sources of sand.

Conventionally, sand is mined and then transported to a well site for use in fracking. When sand had to be transported long distances, it was conventionally dried at the mine site from a moisture content of 10%-15% moisture to <1% moisture. However, because sand is "re-hydrated" in a slurry for use in a fracking operation, there is an increase in in-basin and in-field mining, which results in wet sand delivery.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a debris separator may include a housing having an inlet end, an outlet end, and an internal bore therebetween having a tapered discharge transitioning to the outlet end; and a filter basket connected to the housing at the inlet end and extending into the internal bore, thereby forming an annulus between the filter basket and the housing, the filter basket having a mesh size selected to pass a slurry of proppant therethrough and retain solid objects of a larger size than the proppant.

In another aspect, embodiments disclosed herein relate to a fracking system that includes a blender that receives proppant and forms a slurry thereof; a manifold downstream of the blender configured to receive the slurry; one or more frac pumps fluidly connected to the manifold, receiving the slurry from the manifold via low pressure lines, and discharging the slurry from the one or more frac pumps under high pressure to a wellhead via the manifold through high pressure lines; and one or more debris separators that filters the slurry to remove solid object of a larger size than the proppants therefrom and being located at one or more locations between the blender and the one or more frac pumps.

In yet another aspect, embodiments disclosed herein relate to a method of filtering a frac slurry that includes passing a frac slurry of water and proppant into one or more debris separators having: a housing having an inlet end, an outlet end, and an internal bore therebetween; and a filter basket connected to the housing at the inlet end and extending into the internal bore, thereby forming an annulus between the filter basket and the housing; and allowing the slurry to flow into the filter basket and retain solid objects of a larger size than the proppant while the slurry of water and proppant passes through the filter basket.

Other aspects and advantages of the claimed subject matter will be apparent from the following description and the appended claims.

DETAILED DESCRIPTION

In one aspect, embodiments disclosed herein relate to a debris separator for removing debris from proppant or water. Proppants, including but are not limited to sand, treated sand, or synthetic ceramic materials, are pumped downhole in a slurry of water. Debris such as rock, pebbles, tree media, and any other foreign object may be present in a proppant source or water, which if not removed, can pass in to the frac pumps and well bore during the frac process. For example, sand is conventionally screened at a mining location (or prior to being transported to a wellsite), but the increased use of fracking in the industry has changed the sourcing of sand such that "wet" sand may be increasingly used. However, the moisture content within "wet" sand may prevent debris from being removed therefrom using traditional processing equipment. Moreover, it is also recognized that debris can enter other proppant or water storages. Thus, the debris must be removed prior to the water, sand or other proppant being pumped downhole. In embodiments directed to removal of debris from proppant, such debris may be removed from the proppant after the proppant has been slurrified.

Figure 1:
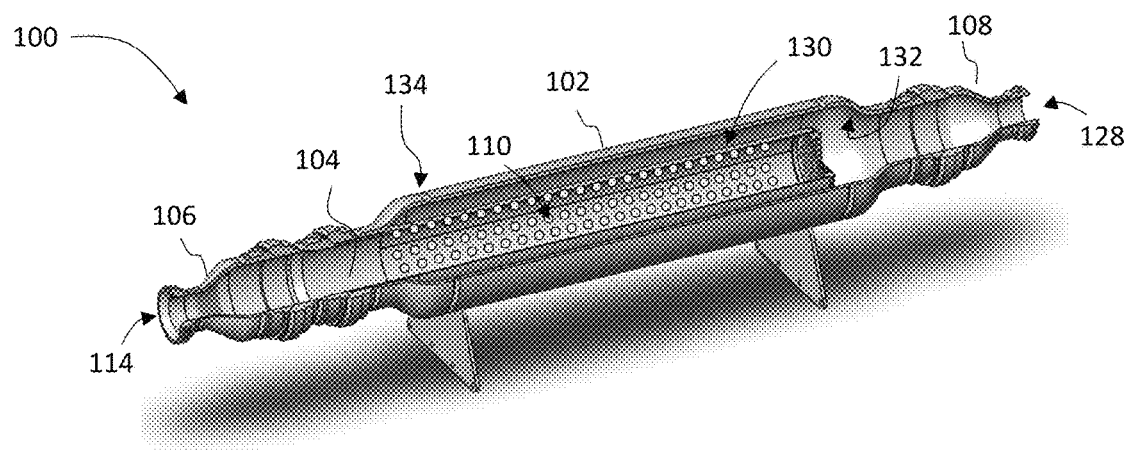
FIG. 1 is an embodiment of a debris separator.
Figure 2:
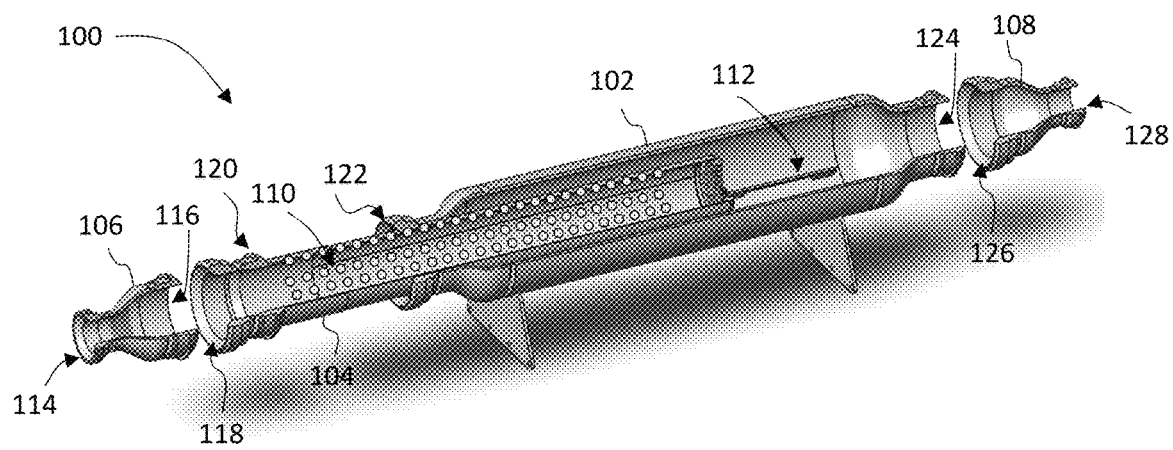
FIG. 2 is an exploded view of the debris separator of FIG. 1

Thus, embodiments of the present disclosure relate to a debris separator that is fluidly connected to the discharge of a blender present on a wellsite to provide an in-line filtration of sand slurry. FIG. 1 shows a cutaway view of a debris separator according to one or more embodiments of the present disclosure, while FIG. 2 shows an exploded view of FIG. 1. Looking at FIGS. 1 and 2 together, a debris separator 100 includes a housing 102 in which a filter basket 104 is installed. Filter basket 104 includes a screen 110 that allows for debris to filter out of a slurry that flows therethrough. The internal bore surface of housing 102 may include one or more guides 112 on which filter basket 104 may rest within housing 102. For example, guides 112 may optionally centralize the filter basket 104 within the housing such that a consistent annulus geometry is maintained when the filter basket 104 is installed within housing 102.

At each end of debris separator 100, are connectors 106, 108, specifically inlet connector 106 and outlet connector 108 that are configured to connect, on the inlet end, to a frac blender (not shown) and on an outlet end, to a manifold (not shown). However, it is envisioned that in one or more embodiment the debris separator 100 may be used in either flow direction, including where flow is in the reverse direction such that connector 108 is the inlet end and connector 106 is the outlet end.

As shown, there are a plurality of connections (all water-tight connections) within debris separator 100 that are made between the inlet connector 106, filter basket 104, housing 102, and outlet connector 108, and also to connect debris separator 100 with the frac blender and manifold. For simplicity, these connections are referenced by sequential number starting with the inlet end (where connector 106 is an inlet connector) and moving downstream to the outlet end (where connector 108 is an outlet connector) of debris separator. However, it is understood that when the debris separator is used in the reverse flow direction, references to upstream and downstream would correspondingly change.

A connection between debris separator 100 and a hose or other conduit in fluid connection with the outlet of frac blender (not shown) may be made between first connection end 114 on inlet connector 106 and hose or other conduit (not shown). Inlet connector 106 also includes (on its downstream end) second connection end 116, that makes a connection with third connection end 118 on filter basket 114. Adjacent to third connection end 118 on filter basket 104 is fourth connection end 120, which makes a connection with fifth connection end 122 on housing 102. At the downstream end of debris separator 100, housing 102 has a sixth connection end 124 that makes a connection with seventh connection end 126 on outlet connector 108. Outlet connector 108 also includes an eighth connection end 128 that makes a connection with hose or other fluid conduit (not shown) that takes filtered slurry to a manifold to be pumped into a well for a fracking operation. It is noted that each of such connections are water-tight connections, such as but not limited to a camlock or hammer union, so that the slurry passing through the debris separator 100 does not leak. Each side of the separator 100 may be equipped (such as with valves) with the ability to isolate the chamber within housing 102.

However, it is also envisioned while inlet connector 106 and outlet connector 108 are shown as separate pieces from housing 102 and filter basket 104, it is envisioned that either or both connectors could be integrated with one of the other components (housing or filter) in one or more embodiments. In such embodiments, the sequential numbering may change as there would be fewer connections. Thus, connection ends may also be referenced by the component making the connection and which end (inlet and outlet) of the component the connection is being made. While such embodiments are envisioned and are within the scope of the present disclosure, the use of separate connectors (as illustrated) may advantageously allow for easier filter removal and quicker operations when a filter basket 104 is full, and a new debris separator 100 is to be brought online.

As a slurry (of water, proppants such as but not limited to sand, and optional components such as acid, suspending agents, or other chemicals) flows through the debris separator 100, the slurry flows into debris separator 100 at first connection end 114 and into the filter basket 104 and through screen 110, when connector 106 is an inlet connector. The screen 110 retains debris or solid objects larger than the mesh size of screen 110 in the downstream end of filter basket 104, while the slurry (and proppants having particle sizes sufficiently small enough to pass through the screen 110) flows into the annulus 130 created between the filter basket 104 and the housing 102. The slurry is then discharged from the debris separator 100 at eighth connection end 128 having the debris or other solid object removed therefrom. However, as mentioned above, it is also envisioned that the debris separator 100 may be used where the slurry flows into the separator 100 through connector 108 (i.e., in the reverse direction as discussed above). In such an embodiment, slurry flows into debris separator 100 at connection end 128 and into the annulus 130. Slurry flows through screen 110 and filter basket 104. The screen 110 retains debris or solid objects larger than the mesh size of screen 110 in the annulus 103, while the slurry (and proppants having particle sizes sufficiently small enough to pass through the screen 110) flows into the filter basket 104. The slurry is then discharged from the debris separator 100 at connection end 114 having the debris or other solid object removed therefrom.

Figure 3:
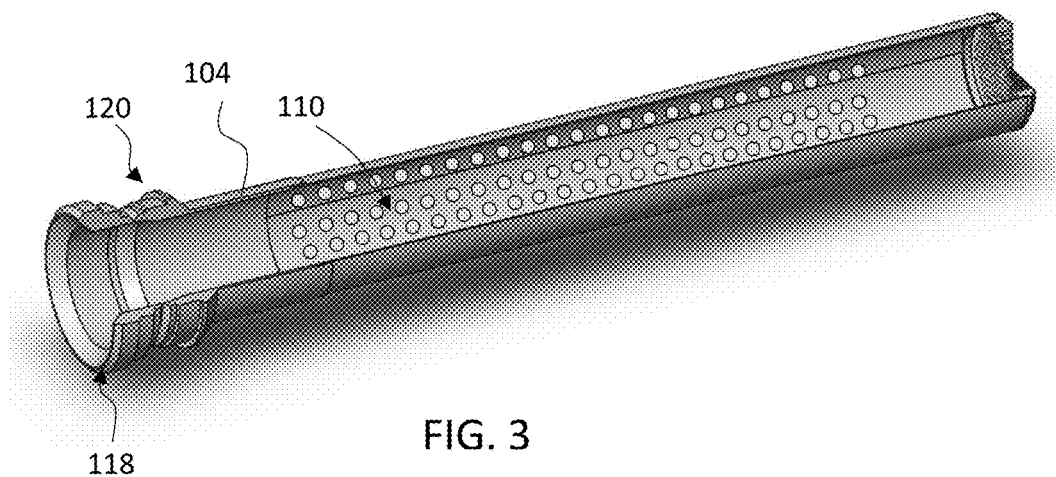
FIG. 3 is the filter of the debris separator of FIG. 1.

The mesh size of screen 110 (shown in FIG. 3 in greater detail) may range from a lower limit of any of 120 mesh, 60 mesh, 40 mesh, 20 mesh, $\frac{1}{16}$ inch, $\frac{1}{8}$ inch, or $\frac{3}{16}$ inch, to an upper limit of any of $\frac{1}{2}$ inch, $\frac{3}{4}$ inch, 1 inch, 1.5 inches, or 2 inches to allow for sand or proppants to easily flow through (without clogging at the screen) but also remove large objects that would damage downhole pumps or the wellbore, and the like. Considering the quantities of slurry that will pass through the debris separator 100 and the abrasive nature of sand, it is envisioned that the internal surfaces of housing 102, inlet connector 106, and outlet connector 108, and all surfaces of filter basket 104 may be provided with an abrasion resistant coating.

It is also envisioned that when the debris separator is being used to filter debris from water, a small mesh size may be desired, such as a screen having a mesh size smaller than 120 mesh. That is, it is envisioned that the debris separators described herein may be used to remove debris from water that does not have a proppant added thereto, that may be used in various drilling or completion operations. For example, it is envisioned that such filtered water may be desirable for use in drilling out frac plugs after fracking is complete with coiled drilling.

As illustrated, housing 102 has a larger diameter than filter basket 104 to allow for the creation of annulus 130 through which the filtered slurry flows to exit the debris separator 100. For example, housing may have an outer diameter greater than 4 inches, whereas filter basket may have a diameter greater than 2 inches. The annulus size may range, for example, from 2-50% of the housing diameter, or for example, from a lower limit of any of 2, 5, or 10% to an upper limit of any of 15, 25, 40, or 50% of the housing diameter. The annulus may be sized to allow for sufficient space between the walls of the housing 102, the filter basket 104, and the media filtered in the filter basket 104 to allow continuous flow of the slurry to pass therethrough throughout the filtering operation.

The diameter of inlet connector 106 may be variable, varying from the first connection end 114 to the second connection end 116, or it may have the same diameter across its length, depending on the diameter of hose or other fluid conduit (for either the blender or the manifold) to which it is connected. While inlet connector 106 is shown as having a single inlet (and single inlet connection end 114), it is envisioned that the inlet connector 106 may be configured to have a plurality of inlet connection ends 114 such that inlet connector 106 operates as a manifold to bring multiple flows into a single debris separator 100. Similarly, outlet connector 108 may have multiple outlet connection ends 128. In such embodiments, it is understood that connectors 106 or 108, as well the remainder of debris separator 100 including housing 102 and filter basket 104, may have a larger diameter to accommodate a larger volume of slurry flowing therethrough. That is, the diameter of the first connection end 114 and eighth connection end 128, as well as diameter of housing 102 and filter basket 104, may be selected to accommodate the other equipment at a frac job. For example, use of separate inlet connector 106 and outlet connector 108 may allow for the sizing of each, and specifically first connection end 114 and eighth connection end 128, to be selected at a jobsite depending on the sizing of hoses or other conduits connected to the upstream and downstream equipment at the site. Housing 102 and filter basket 104 sizing may be selected to accommodate the volume of slurry being pumped therethrough As the housing 102 has a larger diameter than the filter basket 104, it is noted that the annulus 130 discharges the slurry into the outlet connector 108. The housing 102 may include a tapered discharge 132 adjacent outlet connector 108 so as to provide a smooth bore transition and reduce or prevent sand or other proppants from packing off within the housing as the slurry is discharged from the debris separator.

While not illustrated, it is envisioned that pressure gauges or transducers may be provided on debris separator 100, for example, on the housing 102, or the inlet and outlet of each end, such as in inlet connector 106 or outlet connector 108 that may provide an operator with an indication (i.e., a pressure change in the annulus or a pressure difference across the length of the debris separator) that the filter basket has retained a particular volume of debris from the slurry, and it should be emptied (or the debris separator should be changed). Another embodiment may use a flow meter on each end to measure differences in flow across the debris separator to provide an indication that the filter basket has retained a particular volume of debris from the slurry, and it should be emptied (or the debris separator should be changed). Thus, given the need to periodically change the filter basket 104 within a debris separator or change to a second debris separator, the debris separator 100 may be provided with quick change features so that necessary replacement can occur and the debris separator can be brought back online to continue filtering slurry. It is envisioned that the valves (not shown) on debris separators may be manual or remotely operated. It is also envisioned that the pressure gauges may trigger a warning which a threshold deviation of the pressure signal is reached, triggering the need for valve closure and clean out/replacement. It is also envisioned that instead of changing the filter basket 104 within debris separator 100, flow through the debris separator can be reversed such that debris collected within filter basket 104 (or in annulus when operated in the reverse direction) may flow out through the separator inlet as a backwash.

Figure 4:
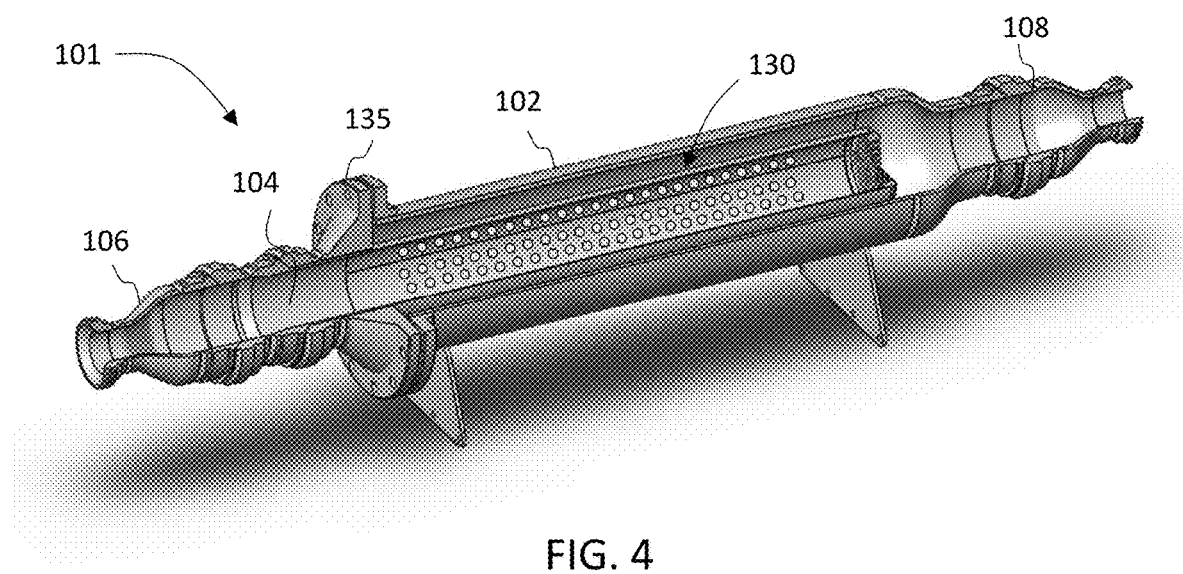
FIG. 4 is another embodiment of a debris separator.

Referring now to FIG. 4, another embodiment of a debris separator is shown. As shown debris separator 101 includes a housing 103, filter basket 104, inlet connector 106, and outlet connector 108 like the embodiment shown in FIGS. 1-2 (where like reference numbers refer to like parts). However, while housing 102 of debris separator 100 in FIG. 1 includes welded pieces and a weld seam 134, the housing 103 of debris separator 101 provides a flange 135 in its construction, which may allow for increased access to the annulus 130 which may be used during a cleaning operation in the event any sand packs within the debris separator 101.

Figure 5:
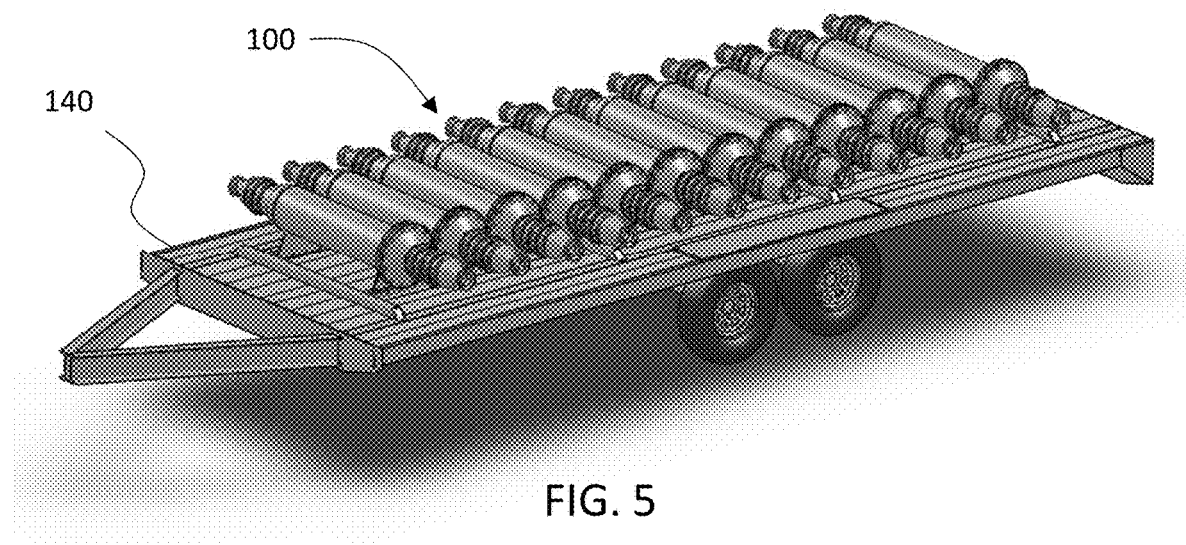
FIG. 5 is a plurality of debris separators mounted on a trailer.

A plurality of debris separators 100 (or 101) may be mounted together on a trailer 140 or skid (not shown), as illustrated in FIG. 5. The plurality of debris separators 100 may be used together in parallel, each receiving a flow of slurry therethrough. It is also envisioned that a trailer 140 or skid may include a plurality of pairs of redundant debris separators. That is, while a plurality of debris separators 100 may receive a flow of slurry therethrough at the same time, each operational debris separator 100 may have a redundant debris separator waiting in standby to be brought online when the operational debris separator has retained a volume of solid debris.

Figure 6:
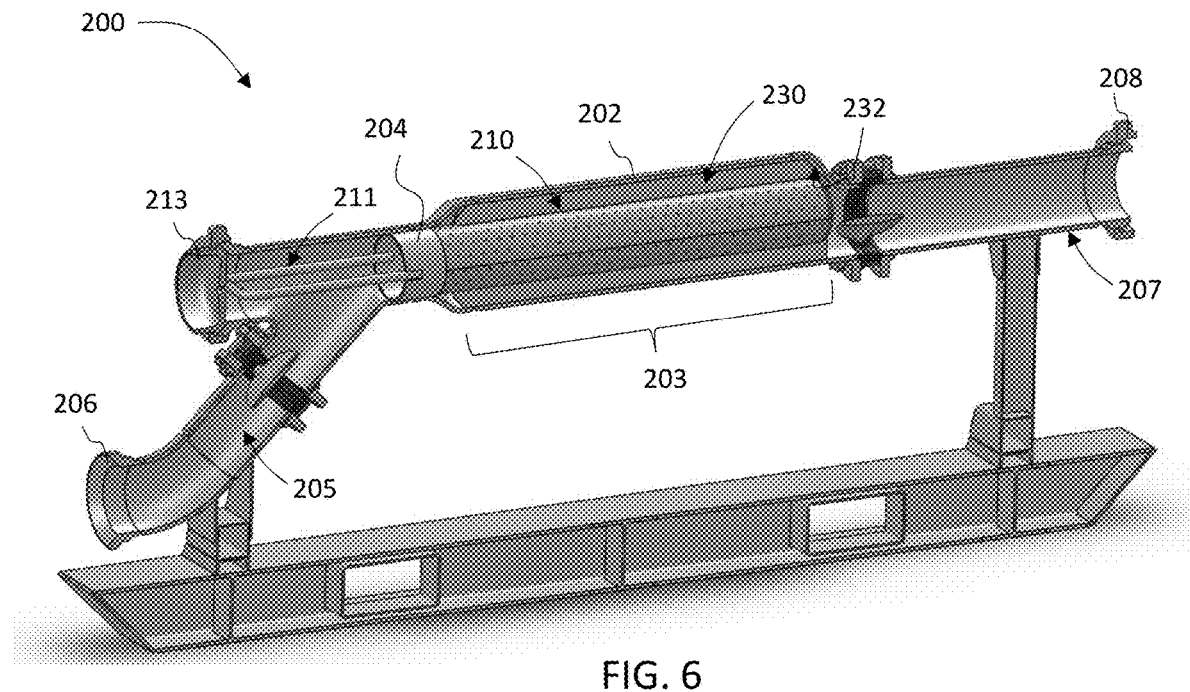
FIG. 6 is another embodiment of a debris separator.
Figure 7:
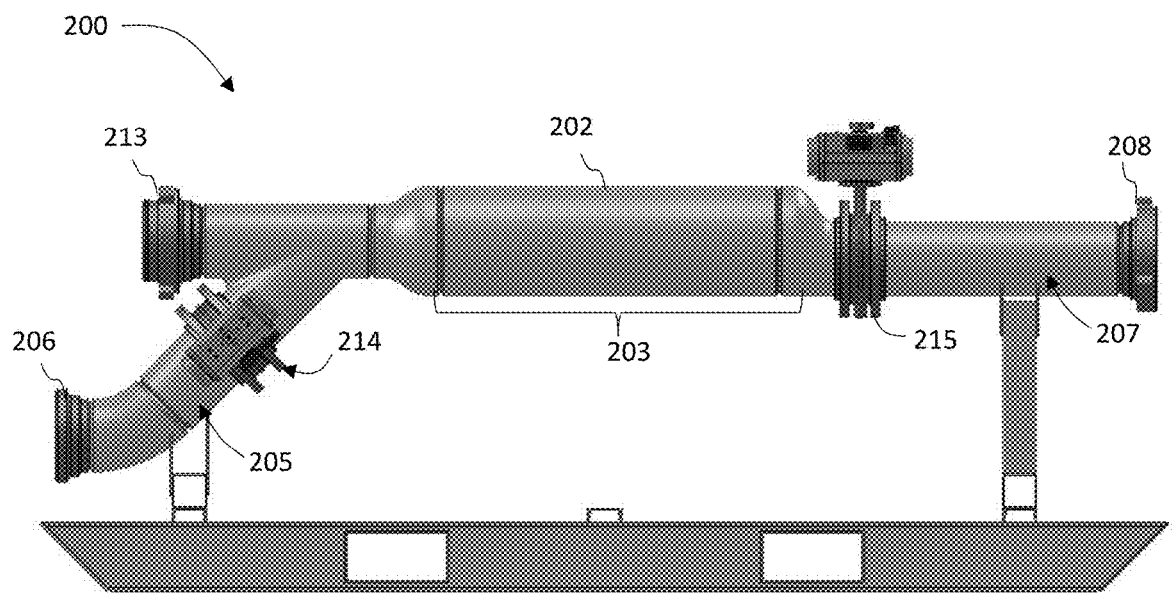
FIG. 7 is another embodiment of a debris separator.

Referring now to FIGS. 6-7, another embodiment of a debris separator is shown. As shown, a debris separator 200 includes a housing 202 in which a filter basket 204 is installed within a central filter section 203 of housing 202. Similar to as described above in FIG. 1, filter basket 204 includes a screen 210 that allows for debris to filter out of a slurry that flows therethrough. Similar to as described above, separator 200 has an internal bore 232 having a tapered discharge transitioning to the outlet 207.

Figure 10:
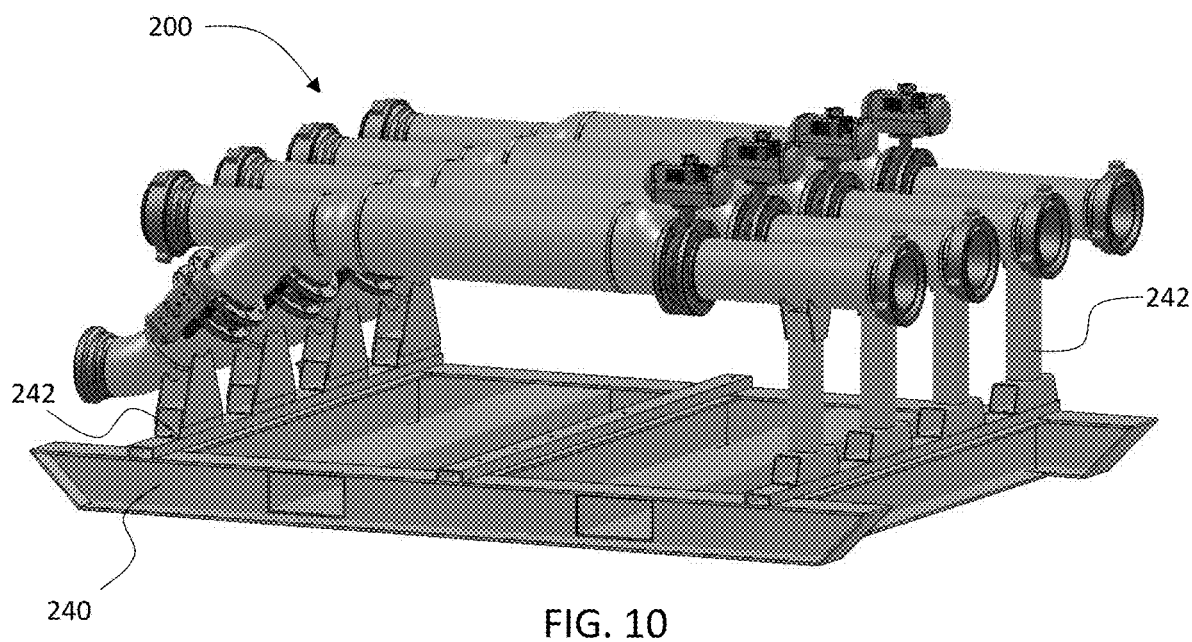
FIG. 10 shows debris separators mounted on a skid.

On one end of debris separator, there is a filter access port 213, which includes an endcap thereon when filter basket 204 is within body. However, when filter basket is full of debris and needs to be emptied, filter basket 204 may be pulled out of separator 200 by handle 211 to remove debris therefrom. Slurry is fed into separator 200 through inlet 205, and after passing through filter basket 204, the slurry (without the debris filtered therefrom) exits through outlet 207 Connectors 206, 208, specifically inlet connector 206 and outlet connector 208 that are configured to connect, on the inlet end, to a frac blender (not shown) and on an outlet end, to a manifold (not shown), at the ends of inlet 205 and outlet 207, respectively. As shown, inlet connector 206 is at a different height elevation than outlet connector 208, with inlet 205 spanning the height between inlet connector 206 and central filter section 203. Thus, housing 202 has a y-shape formed by the arrangement of filter access port 213, inlet 205, and central filter section 203. Moreover, it is also envisioned that separator 200 may be rotated along its axis, thereby removing the height differential, however, the compactness of separators 200 arranged on skid (as shown in FIG. 10) is achieved when the separators are arranged as shown in FIG. 6.

As a slurry of water, proppants such as, but not limited to, sand, and optional components such as acid, suspending agents, or other chemicals flows through the debris separator 200 via inlet 205, the slurry flows into debris separator 200 through the filter basket 204 and through screen 210. The screen 210 retains debris or solid objects larger than the mesh size of screen 210 in the downstream end of filter basket 204, while the slurry, and proppants having particle sizes sufficiently small enough to pass through the screen 210, flows into the annulus 230 created between the filter basket 204 and the housing 202. The slurry is then discharged from the debris separator 200 through outlet 207 having the debris or other solid object removed therefrom. When it filter basket 204 is to be emptied, valves 214, 215 may be closed to prevent the flow of fluid through filter into central filter section 203 of housing 202 and though filter basket 204. It is also envisioned that adjacent valves 214, 215 may be pressure gauges or transducers provided to give an operator with an indication (i.e., a pressure change in the annulus or a pressure difference across the length of the debris separator) that the filter basket has retained a particular volume of debris from the slurry, and it should be emptied (or the debris separator should be changed).

Figure 8:
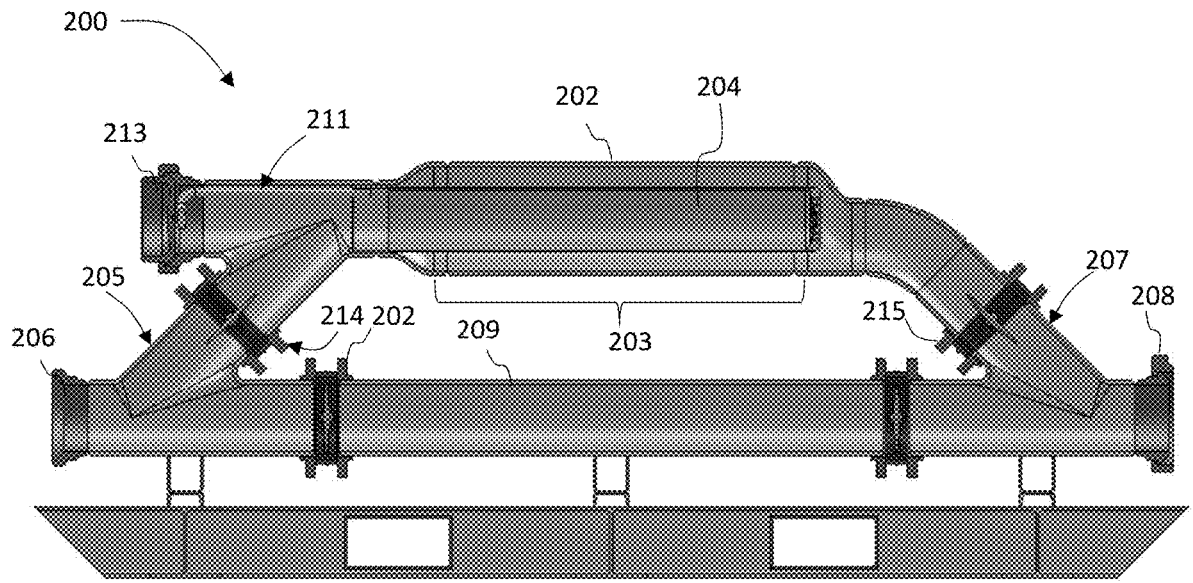
FIG. 8 is another embodiment of a debris separator.

Referring now to FIGS. 8, another embodiment of a debris separator is shown. As shown, a debris separator 200 includes a housing 202 in which a filter basket 204 is installed within a central filter section 203 of housing 202. Similar to as described above in FIG. 6-7, filter basket 204 includes a screen 210 that allows for debris to filter out of a slurry that flows therethrough. Similar to as described above, separator 200 has an internal bore 232 having a tapered discharge transitioning to the outlet 207.

On one end of debris separator, there is a filter access port 213, which includes an endcap thereon when filter basket 204 is within body. However, when filter basket is full of debris and needs to be emptied, filter basket 204 may be pulled out of separator 200 by handle 211 to remove debris therefrom. Slurry is fed into separator 200 through inlet 205, and after passing through filter basket 204, the slurry (without the debris filtered therefrom) exits through outlet 207 Connectors 206, 208, specifically inlet connector 206 and outlet connector 208 that are configured to connect, on the inlet end, to a frac blender (not shown) and on an outlet end, to a manifold (not shown), at the ends of inlet 205 and outlet 207, respectively. As shown, bypass line 209 also extends between inlet connector 206 and outlet connector 208.

Inlet 205 spans the height between inlet connector 206 and central filter section 203. Thus, housing 202 has a y-shape formed by the arrangement of filter access port 213, inlet 205, and central filter section 203. Moreover, it is also envisioned that separator 200 may be rotated along its axis, thereby removing the height differential, however, the compactness of separators 200 arranged on skid (as shown in FIG. 10) is achieved when the separators are arranged as shown in FIG. 6.

As a slurry of water, proppants such as, but not limited to, sand, and optional components such as acid, suspending agents, or other chemicals flows through the debris separator 200 via inlet 205, the slurry flows into debris separator 200 through the filter basket 204 and through screen 210. The screen 210 retains debris or solid objects larger than the mesh size of screen 210 in the downstream end of filter basket 204, while the slurry, and proppants having particle sizes sufficiently small enough to pass through the screen 210, flows into the annulus 230 created between the filter basket 204 and the housing 202. The slurry is then discharged from the debris separator 200 through outlet 207 having the debris or other solid object removed therefrom.

When the filter basket 204 is to be emptied, valves 214, 215 may be closed to prevent the flow of fluid through filter into central filter section 203 of housing 202 and though filter basket 204. It is also envisioned that adjacent valves 214, 215 may be pressure gauges or transducers provided to give an operator with an indication (i.e., a pressure change in the annulus or a pressure difference across the length of the debris separator) that the filter basket has retained a particular volume of debris from the slurry, and it should be emptied (or the debris separator should be changed). In another embodiment, where it is desired to flush debris separator 200, a valve within outlet connector 208 may be closed to prevent the outflow of fluid.

Figure 9:
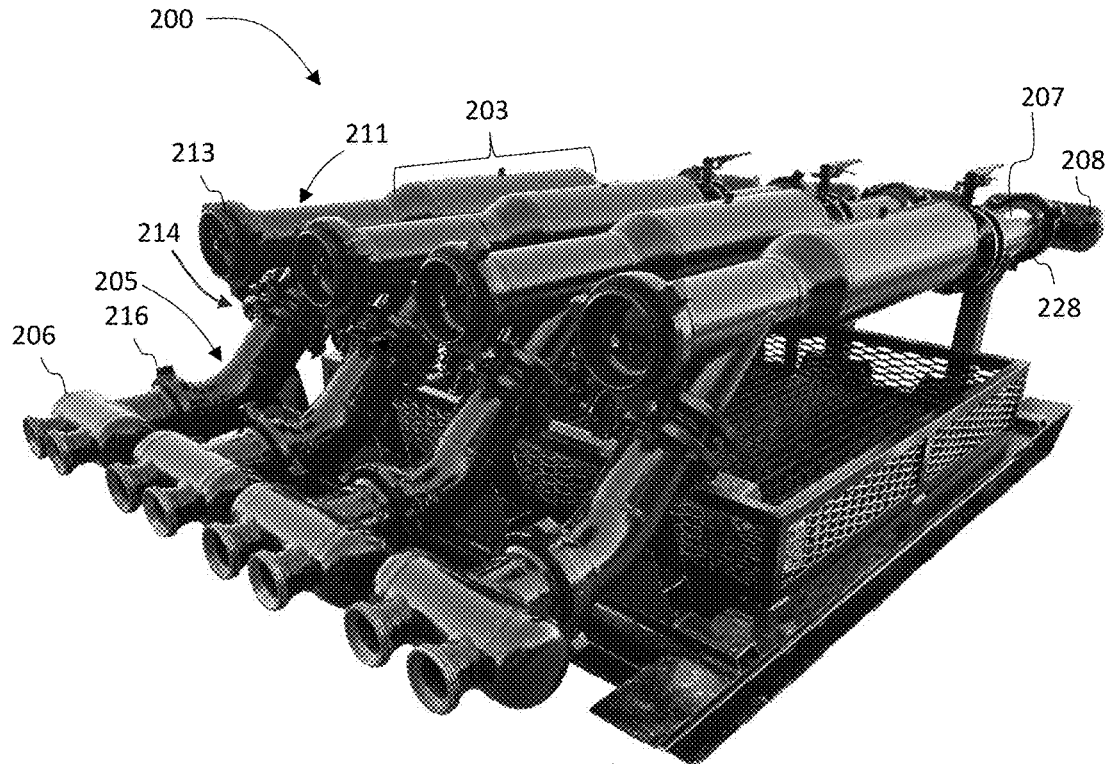
FIG. 9 is another embodiment of a debris separator.

Referring now to FIG. 9, another embodiment of a debris separator is shown. As shown, a debris separator 200 includes a housing 202 in which a filter basket (not separately shown) is installed within a central filter section 203 of housing 202. Similar to as described above in FIG. 6-7, filter basket (not separately shown) includes a screen (not separately shown) that allows for debris to filter out of a slurry that flows therethrough. Similar to as described above, separator 200 has an internal bore (not separately shown) having a tapered discharge transitioning to the outlet 207.

At each end of debris separator 200, are connectors 206, 208, specifically inlet connector 206 and outlet connector 208 that are configured to connect, on the inlet end, to a frac blender (not shown) and on an outlet end, to a manifold (not shown). However, it is envisioned that in one or more embodiment, the debris separator 200 may be used in either flow direction, including where flow is in the reverse direction such that connector 208 is the inlet end and connector 206 is the outlet end. As shown, inlet connector 206 and outlet connector 208 are separate pieces from housing 202, though, it is also envisioned either or both connectors could be integrated with one of the other components (housing or filter) in one or more embodiments.

As shown inlet connector 206 and outlet connector 208 each have more than one inlets 246 thereto and outlets 248 therefrom, respectively. This may allow for multiple hoses to flow into and out of a single filter and/or may allow for ease in changing connections to and from debris separator 200. When inlet connector 206 and outlet connector 208 are distinct structural components, they may be joined by a water-tight connection to debris separator at connection 216 and connection 128, respectively.

A plurality of debris separators 200 may be mounted together on a skid 240, as illustrated in FIG. 10 As shown, each separator 200 is supported by stands 242 extending between skid 240 and separators 200. The plurality of debris separators 200 may be used together in parallel, each receiving a flow of slurry therethrough. It is also envisioned that a skid 240 or trailer may include a plurality of pairs of redundant debris separators. That is, while a plurality of debris separators 200 may receive a flow of slurry therethrough at the same time, each operational debris separator 200 may have a redundant debris separator waiting in standby to be brought online when the operational debris separator has retained a volume of solid debris.

Figure 11:
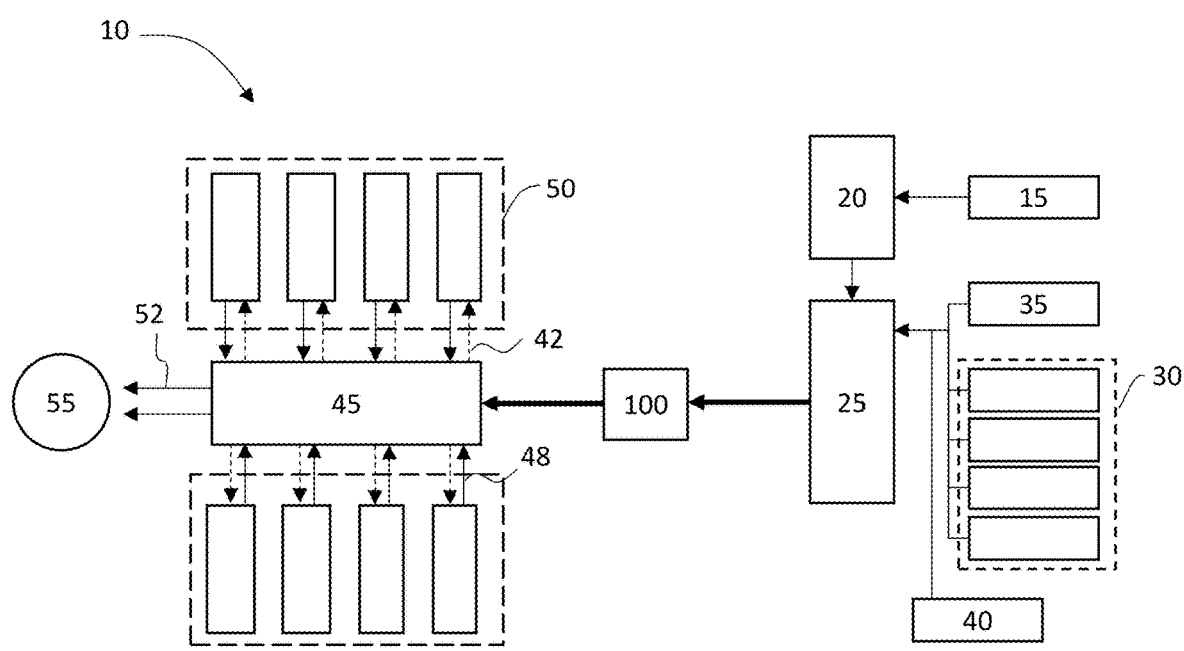
FIG. 11 shows a schematic overview of a wellsite.

As mentioned above, the debris separator 100 is used on a fracking jobsite. FIG. 11 shows a simplified schematic view of a wellsite in which the debris separators described above may be used. As shown, a fracking system 10 on a wellsite may include sand tanks 15 that contain sand (or other proppant) that is received by a sand delivery system 20. Sand delivery system 20 moves sand (or other proppant) into blender 25 (often via a hopper) where it is mixed with water from water tank 30 and one or more of acid from acid tank 35 and other chemicals (such as gelling agents) from chemicals units 40. While not shown, it is envisioned that water and chemicals may be mixed in a hydration unit to hydrate chemicals such as gelling agent prior to being mixed with sand to form a slurry. Thus, debris present in either the proppant or water supply may also be present in the slurry formed in blender 25.

Once mixed in blender 25, slurry passes through one or more debris separator 100 to have such larger debris or other solid objects filtered or moved therefrom, before being routed to manifold 45. The removal of such debris or other solid objects may be particularly advantageous when the proppant is sourced from in-basin and in-field mining or wet sand (generally understood to mean sand having a moisture content of greater than 3%) or sand that has not been subjected to prior processing. For example, the moisture within wet sand may prevent debris from being removed therefrom using traditional processing equipment; however, embodiments of the present disclosure may allow for easy removal of the debris from wet sand (as well as water or other proppant) because the debris separator may be placed in-line between the blender and a manifold.

It is envisioned that the one or more debris separators 100, 200 may be mounted on a skid or trailer (as shown in FIGS. 5 and 10), and the one or more debris separators 100, may be mounted in either a vertical or horizontal configuration or any angle therebetween, depending on the layout required at a well site. As mentioned above, the one or more debris separators 100 may include redundancy (with extra sets of debris separators being located on the skid or trailer so that when a debris separator 100 is full or the filter basket therein is clogged, an operator can quickly direct flow into a second or third debris separator 100 so the first debris separator 100 can be cleaned out.

After being filtered, the slurry is discharged from debris separator 100 through hoses or other conduits which convey it into two or more low-pressure lines in manifold 45. Thus, debris separator is directly connected via one or more hoses, fluid conduits or lines to the blender on the inlet end of the debris separator, and the manifold on the outlet end of the debris separator. The low-pressure lines in manifold 45 feed the slurry to an array of frac pumps 50, perhaps as many as a dozen or more, through low-pressure "suction" hoses (indicated by dotted arrows).

Frac pumps 50 take the slurry and discharge it at high pressure through individual high-pressure "discharge" lines (shown in solid arrows) into two or more high-pressure lines on manifold 45. The slurry from each high-pressure line flow together, i.e., they are manifolded on manifold 45. The manifold allows the slurry to be selectively diverted to, for example, one or more well heads 55 for a fracturing operation.

However, it is envisioned that the debris separators of the present disclosure may be used at other locations in a fracking system than as illustrated in FIG. 11. Fracking systems are viewed as having "low-pressure" and "high-pressure" sides. The low pressure side includes the components upstream of the inlet of frac pumps 50, e.g., sand tanks 15, sand delivery system 20, blender 25, water tank 30, acid tank 35, chemicals units 40, low pressure side of frac manifold 45, and low pressure lines 42 leading from frac manifold 45 to pumps 50, which operate under relatively low pressures. The high pressure side includes all the components downstream of the discharge outlets of pumps 50, e.g., high pressure lines 48 carrying pressurized slurry, the high-pressure side of frac manifold 45, and flow lines 52 running to wellhead 55, which operate under relatively high pressures. In accordance with embodiments of the present disclosure, it is also envisioned that instead of debris separator 100 being located between blender 25 and manifold 45, it can also be located on or between other equipment, on the low pressure side.

Figure 12:
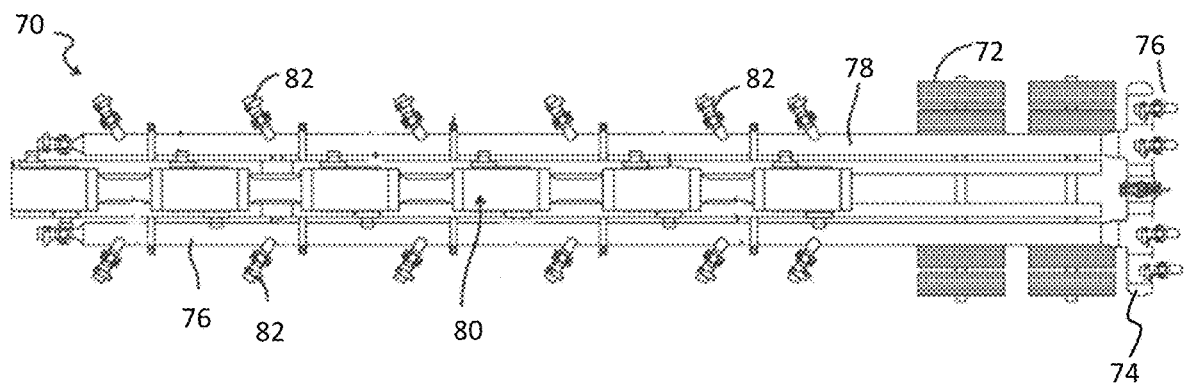
FIG. 12 shows a schematic of a frac manifold.

For example, referring now to FIG. 12, frac manifold 70 is mounted on a trailer 72 and generally includes a suction line manifold 74, two suction lines 78, and missile 80. Suction manifold 74 is mounted near the rear of trailer 72 and receives the discharge from blender (not shown) through connections 76. Suction lines 78 may be mounted to frame along each side of trailer 72. Suction hoses (not shown) leading to pumps (50 in FIG. 9) may be connected to suction connections 82 on suction lines 76. It is envisioned that debris separators of the present disclosure may be mounted on or integrally formed with either connections 76 and/or connections 82. It is also envisioned that other configurations of a frac manifold may be used, and that one or more debris separators may be mounted on or integrally formed with the inlet or outlet on the low pressure side of frac manifold.

Figure 13:
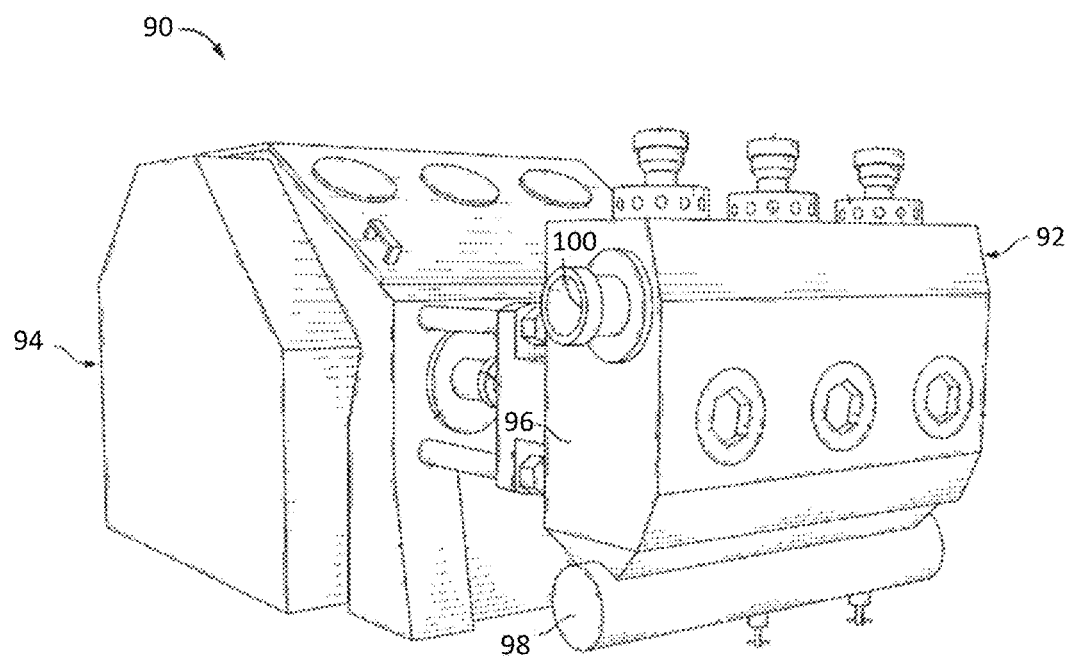
FIG. 13 shows a schematic of a frac pump.

It is also envisioned that debris separator may be mounted on or integrated with an inlet to a frac pump, such as the frac pump 90 shown in FIG. 13. As shown, frac pump 90 has a plurality of synchronized, manifolded reciprocating pumping units mounted in its "fluid end" 92. The pumping units in fluid end 92 are all powered by a common so-called "power end" 94. Slurry enters fluid end 92 of pump 90 through inlets 98 and is pumped out through outlets 100. Each pumping unit has a reciprocating plunger within a cylinder in a common housing or fluid end block 96. In accordance with one or more embodiments of the present disclosure, a debris separator may be mounted on or is integral with inlet 98 so that debris may be removed from slurry prior to the slurry entering the pumping units.

Figure 14:
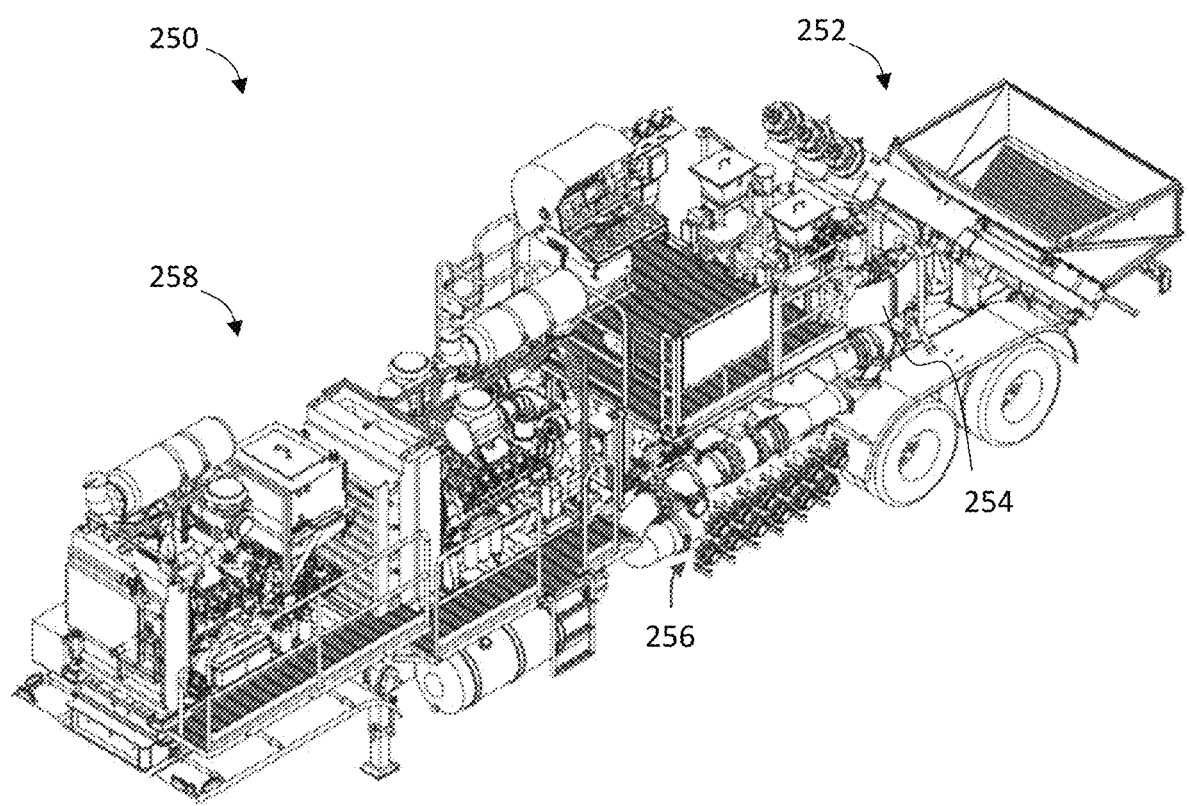
FIG. 14 shows a schematic of a frac blender.

In one or more embodiments, the debris separator may be used at an outlet of a frac blender 250. Referring to FIG. 14, a frac blender 120 is shown. As shown, a frac blender 250 includes a suction system (not shown), a solids system 252, a mixing system 254, a discharge system 256, and a power system 258. The primary function of suction system (not shown) is to receive the liquid phase of frac fluids and deliver it to mixing system 254. The primary function of solids system 252 is to receive solids, such as sand or other proppants, and feed the solids into mixing system 254. Mixing system 254 primarily serves to ensure that the liquid phase supplied through suction system (not shown) and the particulates supplied through solids system 252 are thoroughly blended into a homogeneous slurry. Discharge system 256 primarily serves to accept slurry from mixing system 254 and convey the slurry through debris separators (not shown) into hoses leading to, for example, frac manifold (not shown). Power system 258 serves primarily to power pumps of suction system (not shown), mixing apparatus in mixing system 254, and various control systems provided in blender 250. As mentioned, the debris separators described herein may be integrated with or mounted on one or more outlets of the discharge system 256 of frac blender 250.

Advantageously, the debris separators described herein provide for in line filtration of the slurry that is fluidly connected to the discharge of the blender to reduce or eliminate the presence of debris or solid objects of a larger size than the proppant (resulting for example the source of proppant or water). If not reduced or eliminated, such debris and larger solid objects may damage downstream equipment, for example, the frac pumps.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A fracking system, comprising:
   a blender configured to receive proppant and form a slurry of proppant;
   a manifold located downstream of the blender configured to receive the slurry of proppant from the blender;
   one or more frac pumps fluidly connected to the manifold, the one or more frac pumps configured to receive the slurry of proppant from the manifold via one or more low pressure lines and discharge the slurry of proppant from the one or more frac pumps under a high pressure to a wellhead via the manifold through one or more high pressure lines; and
   one or more debris separators located on an inlet of the one or more frac pumps, the one or more debris separators configured to filter the slurry or proppant to remove solid objects of a larger size than the proppant as the slurry of proppant enters the one or more frac pumps from the manifold,
   where the one or more debris separators comprises:
      a housing having an inlet end, an outlet end, and an internal bore therebetween having a tapered discharge transitioning to the outlet end; and
      a filter basket connected to the housing at the inlet end and extending into the internal bore, thereby forming an annulus between the filter basket and the housing, the filter basket having a mesh size selected to pass a slurry of proppant therethrough and retain the solid objects of the larger size than the proppant.

2. The fracking system of claim 1, wherein the slurry of proppant passes through the filter basket and into the annulus, thereby retaining the solid objects within the filter basket.

3. The fracking system of claim 1, wherein the inlet end comprises a plurality of connection ends for receiving a plurality of flows of the slurry of proppant.

4. The fracking system of claim 1, wherein the filter basket is configured to be removed and inserted into the housing using guides located on an internal bore surface of the housing, wherein the guides centralize the filter basket within the housing.

5. A fracking system comprising:
   a blender configured to receive proppant and form a slurry of proppant; a manifold located downstream of the blender configured to receive the slurry of proppant;
   one or more frac pumps fluidly connected to the manifold, the one or more frac pumps configured to receive the slurry of proppant from the manifold via one or more low pressure lines and discharge the slurry of proppant from the one or more frac pumps under a high pressure to a wellhead via the manifold through one or more high pressure lines; and
   one or more debris separators located between the blender and the manifold, the one or more debris separators configured to receive the slurry of proppant from the blender, filter the slurry of proppant to remove solid objects of a larger size than the proppant, and deliver the slurry of proppant to the manifold,
   where the one or more debris separators comprises:
      a housing having an inlet end, an outlet end, and an internal bore therebetween having a tapered discharge transitioning to the outlet end; and
      a filter basket connected to the housing at the inlet end and extending into the internal bore, thereby forming an annulus between the filter basket and the housing, the filter basket having a mesh size selected to pass a slurry of proppant therethrough and retain the solid objects of the larger size than the proppant.

6. The fracking system of claim 5, wherein the one or more debris separators are connected directly to an outlet of the blender.

7. The fracking system of claim 5, wherein the one or more debris separators comprises an inlet end configured to connect to the blender using a conduit and an outlet end configured to connect to the manifold using a conduit.

8. The fracking system of claim 5, wherein the slurry of proppant passes through the filter basket and into the annulus, thereby retaining the solid objects within the filter basket.

9. The fracking system of claim 5, wherein the inlet end comprises a plurality of connection ends.

10. The fracking system of claim 5, wherein the filter basket is configured to be removed and inserted into the housing using guides located on an internal bore surface of the housing, wherein the guides centralize the filter basket within the housing.

11. A fracking system comprising:
    a blender configured to receive proppant and form a slurry of proppant; a manifold located downstream of the blender configured to receive the slurry of proppant from the blender;
    one or more frac pumps fluidly connected to the manifold, the one or more frac pumps configured to receive the slurry of proppant from the manifold via one or more low pressure lines and discharge the slurry of proppant from the one or more frac pumps under a high pressure to a wellhead via the manifold through one or more high pressure lines; and
    one or more debris separators located on the manifold, the one or more debris separators configured to filter the slurry of proppant to remove solid objects of a larger size than the proppant prior to the slurry of proppant exiting the manifold to the one or more frac pumps,
    where the one or more debris separators comprises:
       a housing having an inlet end, an outlet end, and an internal bore therebetween having a tapered discharge transitioning to the outlet end; and
       a filter basket connected to the housing at the inlet end and extending into the internal bore, thereby forming an annulus between the filter basket and the housing, the filter basket having a mesh size selected to pass a slurry of proppant therethrough and retain the solid objects of the larger size than the proppant.

12. The fracking system of claim 11, wherein the one or more debris separators are located at an inlet of the manifold.

13. The fracking system of claim 11, wherein the one or more debris separators are located on the low pressure lines of the manifold.

14. The fracking system of claim 11, wherein the slurry of proppant passes through the filter basket and into the annulus, thereby retaining the solid objects within the filter basket.

15. The fracking system of claim 11, wherein the inlet end comprises a plurality of connection ends for receiving a plurality of flows of the slurry of proppant.

16. The fracking system of claim 11, wherein the filter basket is configured to be removed and inserted into the housing using guides located on an internal bore surface of the housing, wherein the guides centralize the filter basket within the housing.

* * * * *